March 23, 1943.  L. F. CARTER  2,314,343
ERECTING DEVICE FOR GYRO-VERTICALS
Filed Aug. 31, 1939  2 Sheets-Sheet 1
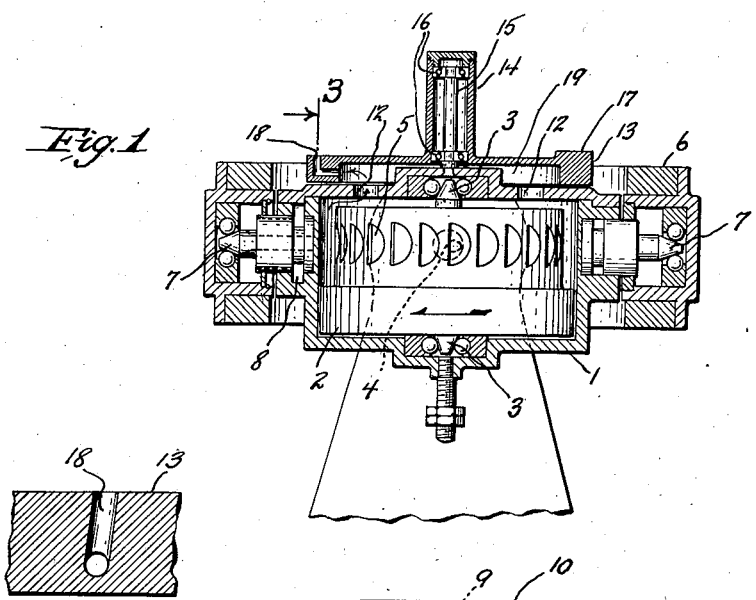
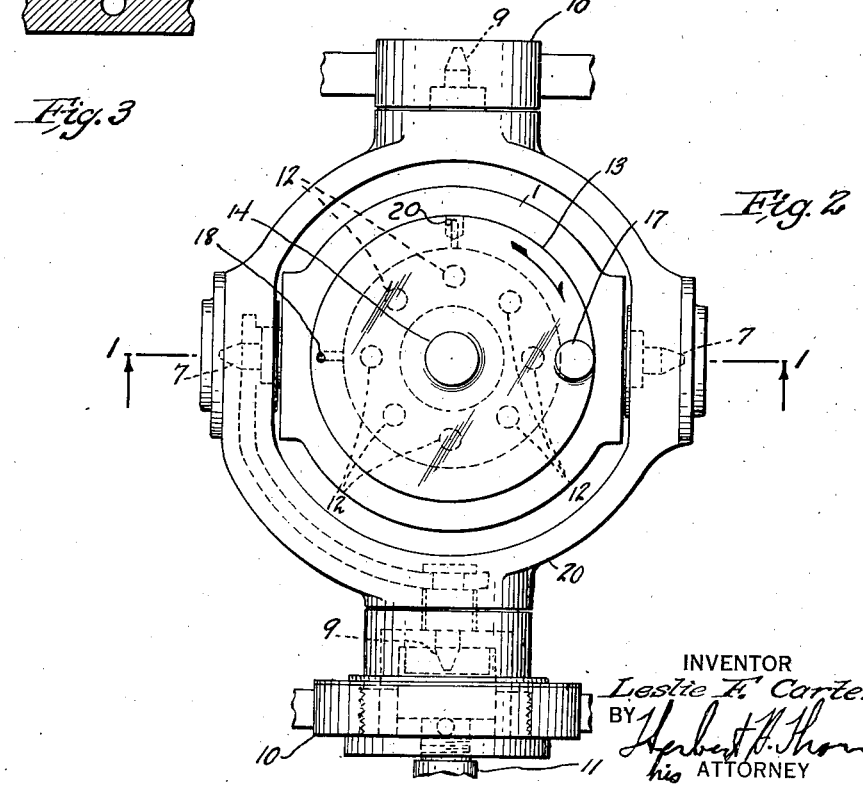
INVENTOR
Leslie F. Carter,
BY
his ATTORNEY March 23, 1943.   L. F. CARTER   2,314,343
ERECTING DEVICE FOR GYRO-VERTICALS
Filed Aug. 31, 1939   2 Sheets-Sheet 2
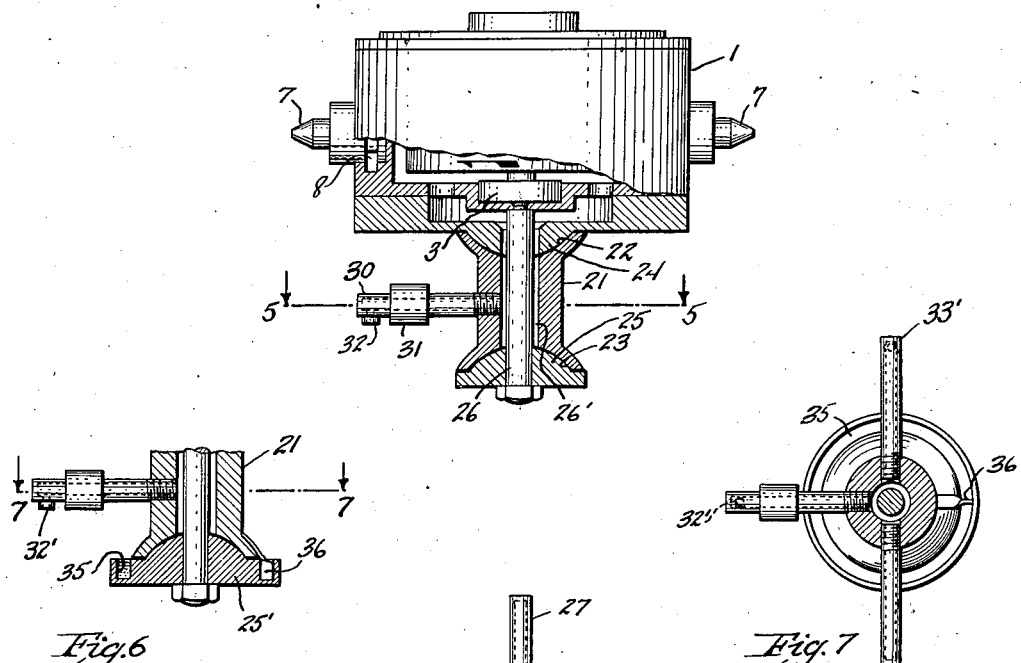
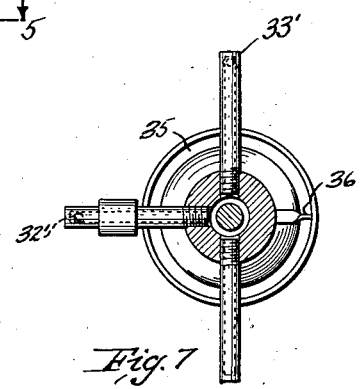
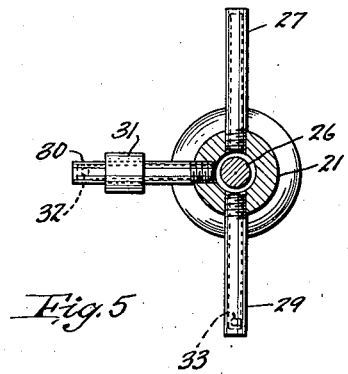
INVENTOR
Leslie F. Carter,
BY
ATTORNEY Patented Mar. 23, 1943

2,314,343

UNITED STATES PATENT OFFICE 2,314,343

ERECTING DEVICE FOR GYRO VERTICALS

Leslie F. Carter, Leonia, N. J., assignor to Sperry Gyroscope Company, Inc., Brooklyn, N. Y., a corporation of New York Application August 31, 1939, Serial No. 292,846

11 Claims. (Cl. 74—5)

This application relates to gyroscopic horizons or gyro verticals in which a gravity controlled restoring force, such as an air jet, is used to maintain the gyroscope in a true horizontal plane, the gyroscope being otherwise mounted in substantially neutral equilibrium.

According to my present invention, I mount on the gyroscope an auxiliary rotor device normally rotated on a vertical spin axis at a much slower rate than the gyro rotor. This auxiliary device is made heavy on one side and is rotated by a relatively weak force, such as an air jet, so that if the gyro becomes inclined, the rate of rotation of the disc will decline as the heavy side thereof is lifted. and accelerate again as the heavy side descends. On this rotor member or disc I also place a torque applying device or source of power such as an erecting jet, preferably spaced 90° from said heavy side. Although this jet is acting continuously, it has no net effect as long as the rotation of the disc is uniform, since the torque exerted on the gyro is equally distributed and the rotation sufficiently rapid so that its effect in producing precession is negligible. When, however, the gyro is inclined, said jet will act for a greater time as the heavy side is being lifted, thus causing precession of the gyroscope. By placing the jet about 90° ahead of the heavy side, the gyroscope will erect itself in a straight path. Preferably, I also employ a second jet or other torque applying power source opposite said heavy side to cancel or balance the reaction of said heavy side on the gyroscope so that the heavy side of said disc has no unbalancing effect on the gyroscope.

Referring to the drawings, showing the preferred form of my invention,

Fig. 1 shows a vertical section through an air driven gyro-vertical taken on line 1—1 of Fig. 2.

Fig. 2 is a plan view thereof.

Fig. 3 is a sectional detail taken on line 3—3 of Fig. 1 through one of the jets.

Fig. 4 is a side elevation, partly in section, of a modified form of the invention using air bearings for supporting the rotary mass.

Fig. 5 is a section taken on line 5—5 of Fig. 4, looking down, the arrow showing the direction of rotation of the gyro rotor.

Fig. 6 is a sectional detail of a modification of Fig. 4.

Fig. 7 is a section taken on line 7—7 of Fig. 6.

The gyro-vertical illustrated is of conventional form, the sensitive element comprising a rotor bearing frame or casing 1 within which the rotor 2 is journaled for spinning about a normally vertical axis 3—3. The rotor is shown as air spun by means of jets 4 which impinge against buckets 5 cut in the periphery of the rotor. The rotor bearing casing, in turn, is mounted within a gimbal ring 6 on horzontal trunnions 7, 7, one or both of which are hollow to admit air from the hollow gimbal ring through the trunions and into the annular space 8 within the casing to lead the air to the spinning jets.

The gimbal ring, in turn, is trunnioned on horizontal trunnions 9, 9 in supporting brackets 10, 10 on or in an outer casing (not shown). Likewise, one or both of said trunnions may be made hollow to admit air into the hollow gimbal ring through the trunnions as from pipe connection 11. Preferably, the gyroscope is mounted in neutral equilibrium about both trunnions. Used air from the casing is shown as emerging through apertures 12 in the top thereof.

Journaled on top of the casing is shown a rotatably mounted unbalanced mass in the form of a disc 13 having a hollow hub 14 journaled on vertical shaft 15 preferably coaxial with the spin axis 3—3 of the rotor and extending upwardly from the top of the casing 1 through anti-friction bearings 16. Said disc is made heavy at one side, i. e., unbalanced, as indicated by the thickened portion 17. To maintain the neutral balance of the gyroscope, I employ an air jet 18 through which a portion of the air from the casing escapes as it emerges from the annular channel 19 underneath the disc, some escaping between the disc and the top of the gyro casing and a greater portion escaping through jet 18 and another jet 20, hereinafter described.

Jet 18 is so located, directed and arranged that its reaction normally balances the downward pull of gravity on the mass 17, so that no torque is exerted on the gyroscope by the mass. To this end, said jet may be upwardly directed and located diametrically opposite to mass 17. If the gyroscope becomes inclined, the disc will no longer rotate at a uniform speed due to said unbalance, but will decelerate from the point where the unbalanced mass passes through the lowest position to the point where it passes through its highest position and accelerate through the other 180°. In other words, the mass will be rotating at its slowest speed when near the top of its inclined position and at its fastest speed when at the bottom of its inclined position. In order that the erecting torque may be exerted at right angles to the tilt of the gyroscope, I place the second jet 20 substantially 90° rotationally ahead of the mass 17, as shown in Fig. 2. The substantially 90° spacing of the jets may be conveniently referred to as a quadrature relationship. This jet therefore exerts its torque on the gyroscope during its longest period when it is at right angles to the higher side of the gyroscope,—in other words, when the mass is near the top of its excursion. Preferably, one or both jets are slightly inclined to the vertical so as to impart a continuous slow rotation to the disc in the direction of the arrow in Fig. 2 (or otherwise, as desired).

Another form of the invention is shown in Figs. 4 and 5. According to this form, the rotatably mounted unbalanced mass which carries the reaction jet is mounted under instead of on top of the gyroscope, and also does not continuously rotate. In this form, said part is shown as comprising a spool-like portion 21 having upper and lower cups 22, 23 which cooperate with button 24 on the bottom of the gyro casing and a cooperating button 25 secured to a stem 26 extending downwardly from the gyro casing. By this means, upper and lower air bearings are provided for floating the spool about a vertical axis preferably coaxial with the spin axis of the rotor, air being supplied between the spherical bearing surfaces through the hollow space surrounding stem 26. Said spool preferably carries three arms, 27, 29 and 30. The arm 30 is shown as carrying a mass 31 which corresponds in function to mass 17 of Fig. 1. In this instance, the weight of the mass is normally balanced by downwardly directed (i. e. under the mass) jet 32, Fig. 4, on the end of said arm, which jet in this case is not inclined and does not rotate the spool. The arm 29 is at right angles to the arm 30 and carries the torque exerting jet 33 which, as viewed in Fig. 5, is directed away from the reader in a direction normal to the plane of the drawings. The arm 27 is merely for the purpose of balancing the weight of the arm 29. In this form of the invention it should be noted that the erecting jet 33 is placed on opposite sides of the mass 31 as compared to the position of the jet 20 with respect to the mass 17, assuming the same direction of spin of the gyro rotor. This is because in this form, where the mass 31 does not spin, it will always come to rest on the low side of the gyroscope, in which position the erecting jet should be 90° ahead of the mass i. e., with relation to the passage of a particular point on the gyro rotor as it moves past these parts, such a point first being adjacent arm 29 and 90° later in its rotation being adjacent arm 31, so as to give proper erection. In the other form, however, the effective position of the mass is on the high side, since it is at that point that it is moving the slowest. On account of the extreme freedom provided by the air bearings, this form of the invention is found to give an operation comparable in accuracy with the form shown in Figs. 1 and 2.

Still an other form of the invention is shown in Figs. 6 and 7, illustrating a modification that might be effected upon the lower portion of the air borne spool of Fig. 4. According to this modification, the unbalanced mass or spool is continuously rotated as in Fig. 1, by slightly inclining the jets 32' and 33'. In this case, however, the jet 33' is opposite the jet 33 for the reason explained above.

When the spin axis of the gyro rotor is vertical or the instrument is normally positioned, the spool 21, in this form of the invention, is rotating at an even speed. Erecting jet 33' is moving around stem 26 in the same manner and consequently does not produce a constantly directed erecting force which disturbs the normal position of the instrument. Either jet 32' or jet 33' or both are inclined sufficiently to produce continuous rotation of the spool member 21 and the parts fixed thereto.

I also preferably provide an annular trough 35 adapted to contain oil, which is shown as secured to the lower button 25'. Into said trough dips a paddle 36 secured to the bottom of the spool 21. This is for the purpose of further retarding the rotation of the spool as the weight is passing through to its high position, since at this time the paddle, which is opposite the weight, is in its lowest position and dipping into the deepest portion of the oil in the trough, whereas when the weight is in its lowest position, the paddle is almost out of the oil.

In both forms of the invention the horizontal lever arm of the mass 17 or 31 is made substantially equal to the vertical lever arm from the trunnion 7—7, so that the action of gravity on the mass is balanced in all positions by the air jet reaction. It may also be noted that in all forms of the invention, while two separate jets are employed, one for exerting a torque which balances the normal gravitational pull on the unbalanced mass and the other for exerting a torque at right angles thereto, the net or combined effect of the two jets is to exert a torque at some intermediate point between the jets which, if the jets were equal, would be at the 45° point.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. An erection device for gyro-verticals comprising a gyro rotor bearing frame forming with its rotor the sensitive element of the gyro-vertical, means for universally supporting said bearing frame in neutral equilibrium, an unbalanced rotatable member mounted on said frame to rotate on a normally vertical axis with its center of gravity to one side of said axis, an air jet directing port in said member by which the gravitational reaction on said frame caused by the unbalance of said member is normally balanced, said member being operatively affected by the force of gravity upon inclination of the frame from a normal position, and a second air jet directing port in said member, situated approximately in 90° spaced relation thereon from the center of gravity of the member, by which a force is exerted on the inclined bearing frame to precess the same in a direction that restores the sensitive element to its normal position.

2. An erection device for gyro-verticals comprising a gyro rotor bearing frame forming with its rotor the sensitive element of the gyro-vertical, means for universally supporting said bearing frame in neutral equilibrium, an unbalanced rotatable member mounted on said frame to rotate on a normally vertical axis with its center of gravity to one side of said axis, means for uniformly rotating said member at a relatively slow speed, an air jet directing port in said member by which the gravitational reaction on said frame caused by the unbalance of said member is normally balanced, said member being operatively affected by the force of gravity upon inclination of the frame from a normal position, and a second air jet directing port in said member, situated approximately in 90° spaced relation thereon from the said balancing air jet port, for exerting an erecting force on the bearing frame, when inclined from its normal position, the reaction of the erecting jet on the inclined bearing frame being at a maximum as the center of gravity of the gravity affected, irregularly rotating, inclined unbalanced member passes through its highest position, and being at a minimum as the center of gravity of said member passes through its lowest position.

3. A gyro-vertical as claimed in claim 2, in which said means for uniformly rotating said member is provided by positioning at least one of said air jet directing ports so that one of the components of the reactive force obtained therefrom effects such rotation.

4. A gyro-vertical as claimed in claim 2, having an annular trough containing a liquid on the rotor bearing frame, and a vane on said rotating member dipping therein to accentuate the retardation of said member upon inclination.

5. An erection device for gyro-verticals comprising a gyro rotor bearing frame forming with its rotor the sensitive element of the gyro-vertical, means for universally supporting said bearing frame in neutral equilibrium, a rotatably mounted member situated on said frame having a normally vertical axis of rotation, an unbalancing mass situated on said member, an air jet directing port in said member by which the gravitational reaction on said frame caused by the unbalancing mass is normally balanced, means for rotating said member, and a second air jet directing port in said member, situated in 90° spaced relation with respect to said balancing air jet directing port, by which a force is exerted, when the bearing frame is inclined, that restores the sensitive element of the gyro-vertical to a normal position.

6. A gyro-vertical as claimed in claim 5, in which the means for rotating said member is provided by positioning at least one of said air jet directing ports so that one of the components of the reactive force obtained therefrom effects such rotation, and a liquid damper is provided connecting said rotating member and said rotor bearing frame.

7. In combination, a gyro-vertical having a gyro rotor bearing frame mounted for freedom about mutually perpendicular normally horizontal axes, a gyro rotor in said frame mounted to spin about a normally vertical axis, a rotatable member mounted on said frame situated in coaxial relation to the spin axis of the gyro rotor and including an unbalancing mass thereon, and air jet directing means situated in said member by which the gravitational reaction on said frame caused by the unbalancing mass is normally balanced and a reactive erecting force is exerted about a horizontal axis of the frame, which is effective when the frame is inclined from a normal position, to restore the spin axis of the gyro rotor to a normal position.

8. The combination of elements, as claimed in claim 7, in which the air jet directing means in said member is positioned so that one of the components of the reactive force obtained therefrom is effective to cause said member to normally rotate at a uniform speed.

9. The combination of elements, as claimed in claim 7, in which the air jet directing means in said member is positioned so that no component of the reactive force obtained therefrom tends to cause said member to rotate, whereby upon inclination said mass seeks the low side of said frame.

10. The combination of elements, as claimed in claim 7, wherein the air jet directing means in said member is formed by two ports arranged in quadrature relation, one or both of said ports being positioned so that the reactive force obtained therefrom has a component which causes said member to rotate at a uniform speed.

11. The combination of elements, as claimed in claim 7, wherein the air jet directing means in said member is formed by two ports arranged in quadrature relation, one of said ports directing the jet by which the unbalanced mass is balanced and the other of said ports directing the jet by which the erecting force is applied.

LESLIE F. CARTER.